(12) United States Patent
Lee et al.

(10) Patent No.: US 8,898,877 B2
(45) Date of Patent: Dec. 2, 2014

(54) MOUNTING DEVICE FOR VEHICLE DOOR HINGE

(75) Inventors: Junyoung Lee, Ulsan (KR); Sung Chul Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 333 days.

(21) Appl. No.: 13/451,864

(22) Filed: Apr. 20, 2012

(65) Prior Publication Data

US 2013/0091687 A1   Apr. 18, 2013

(30) Foreign Application Priority Data

Oct. 14, 2011 (KR) ........................ 10-2011-0105440

(51) Int. Cl.
| | | |
|---|---|---|
| B23Q 3/00 | (2006.01) | |
| B21D 53/88 | (2006.01) | |
| B25B 27/14 | (2006.01) | |
| E05D 11/00 | (2006.01) | |
| B23P 19/04 | (2006.01) | |

(52) U.S. Cl.
CPC ............. E05D 11/0009 (2013.01); B23P 19/04 (2013.01); *E05Y 2900/531* (2013.01)
USPC ........... 29/281.4; 29/281.5; 29/897.2; 29/468

(58) Field of Classification Search
CPC .......... B23Q 3/00; B21D 53/88; B25B 27/14
USPC .......... 29/897.2, 464, 466, 468, 281.4, 281.5
See application file for complete search history.

(56) References Cited

U.S. PATENT DOCUMENTS

| 6,073,330 | A | * | 6/2000 | Roy | .............................. 29/281.5 |
|---|---|---|---|---|---|
| 6,101,706 | A | * | 8/2000 | Roy | .................................. 29/714 |
| 6,122,809 | A | * | 9/2000 | Roy | .................................. 29/239 |
| 6,122,813 | A | * | 9/2000 | Roy et al. | ................... 29/407.09 |
| 6,122,819 | A | * | 9/2000 | Roy et al. | ......................... 29/714 |
| 6,311,382 | B1 | * | 11/2001 | Jack | .................................. 29/464 |
| 6,910,254 | B2 | * | 6/2005 | Aoki et al. | ...................... 29/464 |
| 7,036,210 | B2 | * | 5/2006 | Jung | ................................ 29/714 |

FOREIGN PATENT DOCUMENTS

| JP | 08039364 A | 2/1996 |
|---|---|---|
| JP | 2002068037 A | 3/2002 |
| JP | 2005047453 A | 2/2005 |
| JP | 2006-273331 A | 10/2006 |
| KR | 10-2009-0113651 A | 11/2009 |

* cited by examiner

*Primary Examiner* — David Bryant
*Assistant Examiner* — Jason L Vaughan
(74) *Attorney, Agent, or Firm* — Edwards Wildman Palmer LLP; Peter F. Corless

(57) ABSTRACT

Disclosed are a method and a mounting device for installing a vehicle door hinge. More specifically, the mounting device f includes a jig frame, at least one clamping unit which is mounted to the jig frame and fixes the jig frame to a side panel and at least one mounting unit which is connected to the jig frame and is configured to install a door hinge which may be mounted to the side panel. In particular, the mounting unit is rotatable based on a slope dispersion of the side panel.

11 Claims, 7 Drawing Sheets

MOUNTING DEVICE FOR VEHICLE DOOR HINGE

CROSS-REFERENCE TO RELATED APPLICATION

This application claims priority to and the benefit of Korean Patent Application No. 10-2011-0105440 filed in the Korean Intellectual Property Office on Oct. 14, 2011, the entire contents of which are incorporated herein by reference.

BACKGROUND OF THE INVENTION (a) Field of the Invention

The present invention relates to a mounting device for a vehicle door hinge. More particularly, the present invention relates to a mounting device for a vehicle door hinge mounting a door hinge to a pillar of a side panel.

(b) Description of the Related Art

Generally, in a door mounting process of a vehicle body manufacturing line, door hinges are mounted to forward and rearward pillars of a side panel and then a door is mounted to the door hinges. In the door hinge mounting process, when a vehicle body is conveyed to a manufacturing line, door hinges are closely adhered to door hinge mounting portions of upper and lower parts of forward and rearward pillars and then the door hinges are connected to the door hinge mounting portions with a tool. More specifically, after matching a door hinge mounting jig with a side panel, door hinges arranged by a hinge arranging unit are closely adhered to door hinge mounting portions of upper and lower parts of forward and rearward pillars.

However, in the conventional techniques, when slopes of a side panel are not parallel to a door hinge with dispersion, there may be a gap between a door hinge and a side panel. Therefore, if the door hinge is engaged by a bolt with a gap present, a door may become twisted and exterior characteristic of a door may be deteriorated. Thus, the door hinge must be re-mounted and productivity is slowed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a mounting device for a vehicle door hinge which improves matching characteristics of a door hinge and a side panel despite the presence of a slope dispersion.

More specifically, a mounting device for a vehicle door hinge according to an exemplary embodiment of the present invention may include a jig frame, at least one clamping unit which is mounted to the jig frame and fixes the jig frame to a side panel and at least one mounting unit which is connected to the jig frame and is configured to install a door hinge which is mounted to the side panel. In particular, the mounting unit is rotatable according to slope dispersion of the side panel.

The mounting unit may include a base plate disposed on a forward side and rearward side of the jig frame respectively, a hinge bracket movably connected to the base plate toward the side panel, a mounting bracket rotatably connected to the hinge bracket and a hinge arranging unit which connected to an upper portion and a lower portion of the mounting bracket respectively and arranges the door hinge. In particular, the mounting bracket may be hingedly connected to the hinge bracket by a hinge pin.

The mounting unit may further include a first guide portion which connects the base plate and the hinge bracket and guides movement of the hinge bracket against the base plate and a second guide portion which connects the hinge bracket and mounting bracket and guides rotation of the mounting bracket around the hinge bracket. The first guide portion may include a plurality of first guide rods connecting the base plate and the hinge bracket and a first spring disposed to the first guide rod between the base plate and the hinge bracket. The second guide portion may include a plurality of second guide rods which connect the hinge bracket and the mounting bracket and guide the mounting bracket to rotate around the hinge pin and a second spring disposed to the second guide rod between the hinge bracket and the mounting bracket.

Furthermore, the second guide rod may be slidably connected to the mounting bracket, at least one first nut may be connected to one end of the second guide rod, a second nut may be connected to the other end the second guide rod and the second spring may be disposed between the first nut and the mounting bracket. In particular, one end of the second guide rod may contact the hinge bracket.

Additionally, a hemisphere protrusion contacting the hinge bracket may be formed to the one end of the second guide rod, and a stopper, contacting the hemisphere protrusion of the second guide rod, may be disposed on the hinge bracket.

A first tooling pin may be mounted to the jig frame for being a reference point of the jig frame to the side panel. The first tooling pin may define the direction and distance to the hinge arranging unit. The hinge arranging unit may include a pin clamper clamping the door hinge. A second tooling pin may also be mounted to the mounting bracket to provide a reference point of the door hinge to the side panel.

In some embodiments, a mounting device for a vehicle door hinge according to an exemplary embodiment of the present invention may include a jig frame disposed along forward and rearward of a side panel, clamping units which are disposed to an upper portion and a lower portion of each of the forward side and the rearward side of the jig frame respectively and are configured to fix the jig frame to the side panel and mounting units disposed to each of the forward side and the rearward side of the jig frame respectively and to install the door hinges which are to be mounted to the side panel. More specifically, the mounting unit is rotatable according to slope dispersion of the side panel.

In some embodiments of the present invention, if a side panel is slanted, a mounting bracket may be rotated to match a door hinge with a side panel, and thus matching characteristic may be improved. Furthermore, a gap between a door hinge and a side panel according to slope dispersion of a side panel may be minimized and thus exterior characteristic of a door may be enhanced.

BRIEF DESCRIPTION OF THE DRAWINGS

Drawings are provided for better comprehension and ease of description However, it is to be understood that the invention is not limited to the disclosed drawings, but, on the contrary, is intended to cover various modifications.

DESCRIPTION OF SYMBOLS

Figure 1:
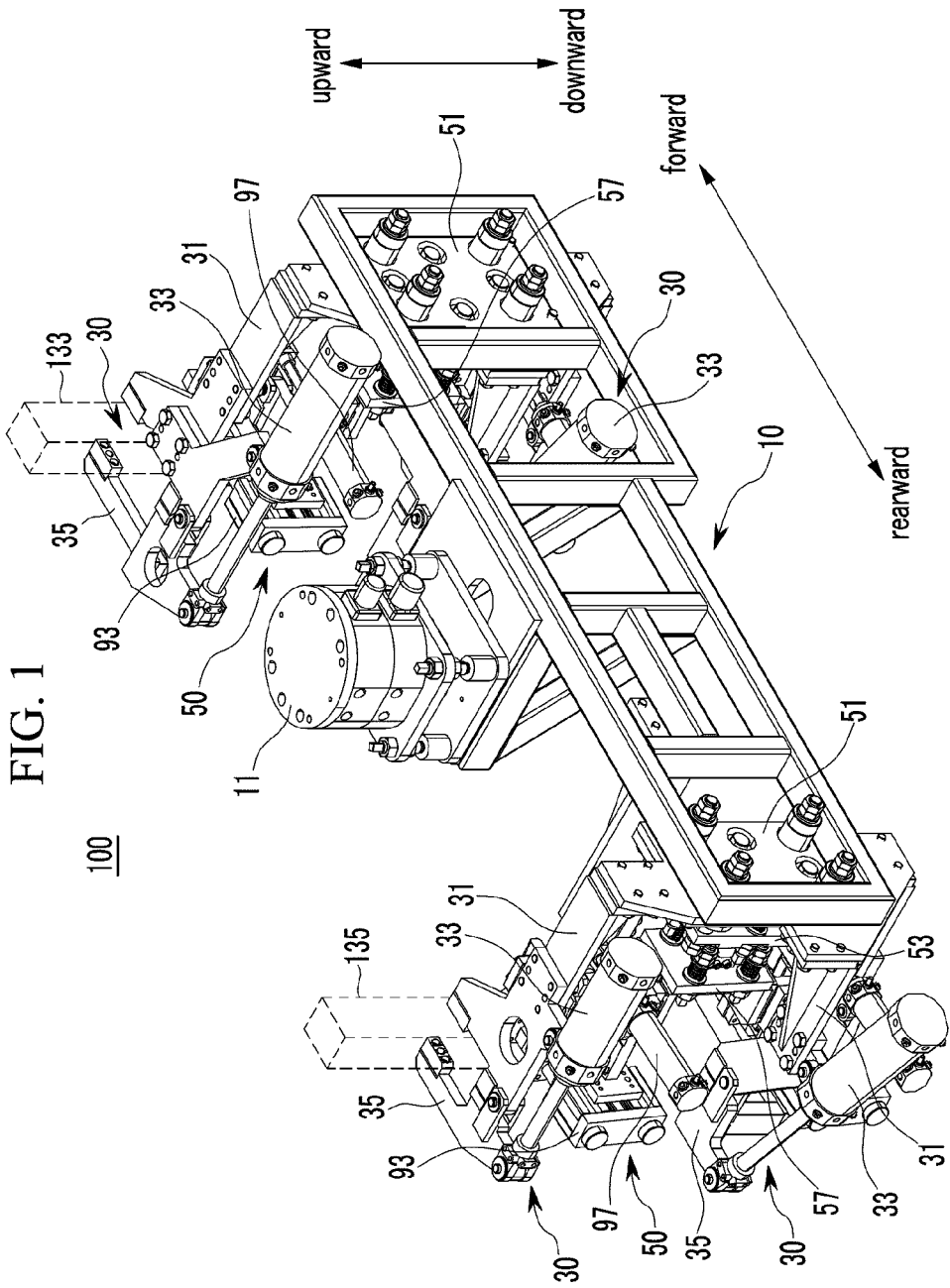
FIG. 1 is a perspective view of a mounting device for a vehicle door hinge according to an exemplary embodiment of the present invention.

10: jig frame
11: tool changer
13: first tooling pin
30: clamping unit
50: mounting unit
51: base plate
53: hinge bracket
55: first guide portion
57: mounting bracket
59: second guide portion
61: first guide rod
65: first spring
71: second guide rod
73: second spring
75: hemisphere protrusion
77: stopper
81: second tooling pin
90: hinge arranging unit
91: pin clamper

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

For better comprehension and ease of description, parts unrelated to explanation may be omitted and like numerals refer to like elements throughout the specification. In the drawings, the thickness of layers, films, panels, regions, etc., are exaggerated for clarity.

Figure 2:
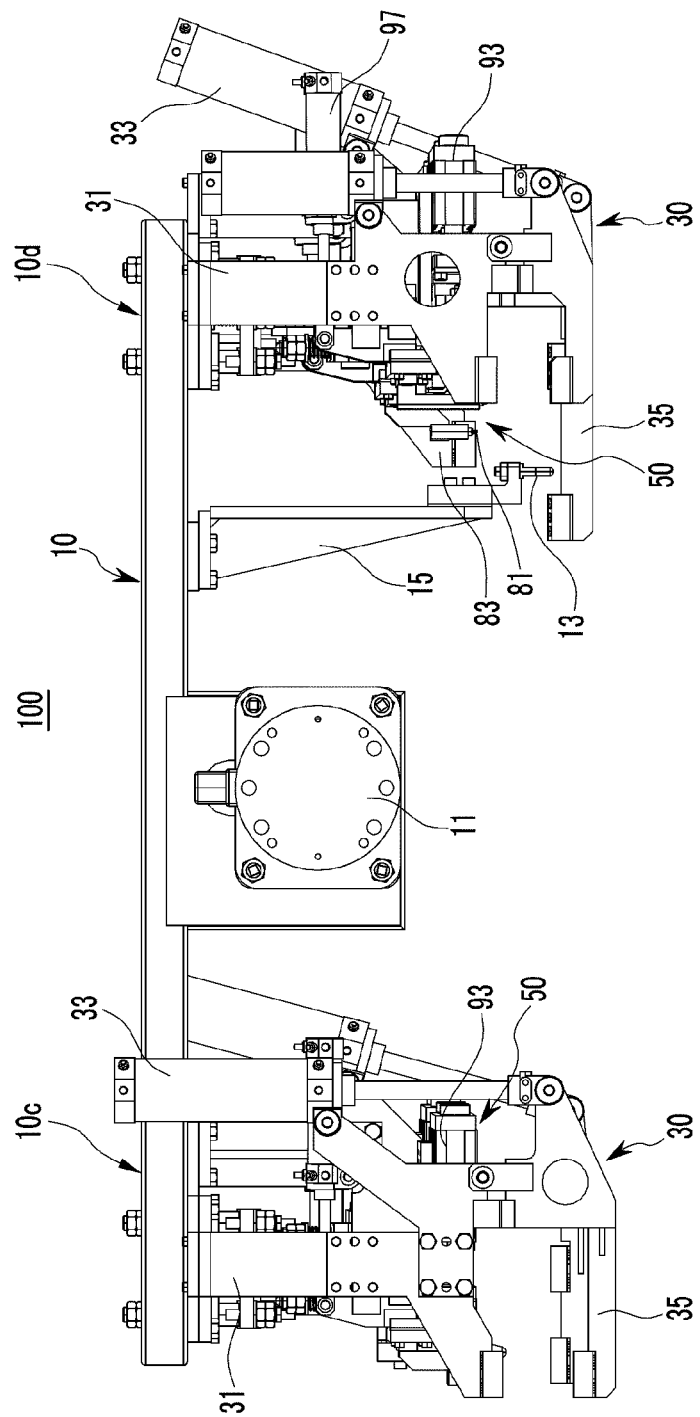
FIG. 2 is a plan view of a mounting device for a vehicle door hinge according to an exemplary embodiment of the present invention.

FIG. 1 is a perspective view of a mounting device for a vehicle door hinge according to an exemplary embodiment of the present invention and FIG. 2 is a plan view of a mounting device for a vehicle door hinge according to an exemplary embodiment of the present invention. Referring to FIG. 1 and FIG. 2, a mounting device for a vehicle door hinge 100 according to an exemplary embodiment of the present invention may be to a door mounting process of a vehicle body manufacturing line, where a front door and a rear door is mounted to a side panel 101. That is, the mounting device for a vehicle door hinge 100 mounts door hinges (referring to 102a and 102b of FIG. 6) to upper and lower parts of the side panel 101.

Figure 7:
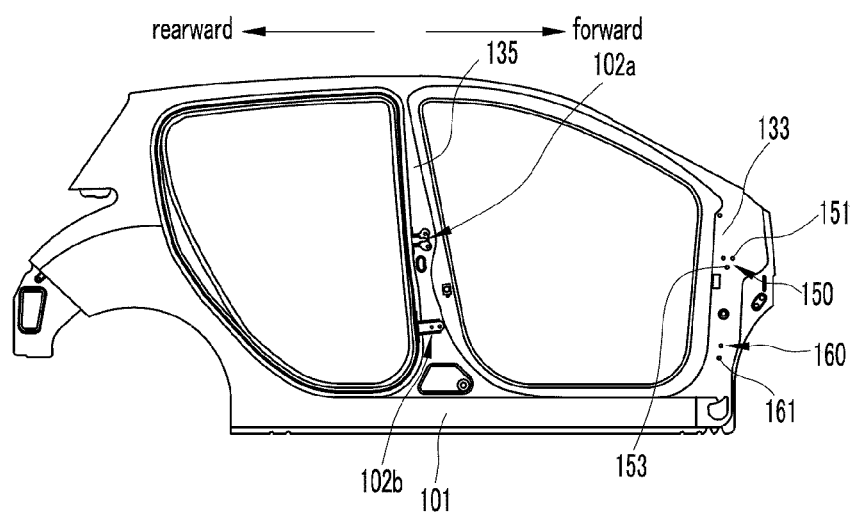
FIG. 7 is a front view showing a vehicle body where a mounting device is applied according to an exemplary embodiment of the present invention.

Door hinge mounting portions (referring to 150 and 160 of a forward of pillar 133 of FIG. 7) are formed to upper and lower parts of forward and rearward of pillars 133 and 135 of the side panel 101 for mounting the door hinge 102a and 102b and bolt apertures (referring to 151 and 161 of the forward of the pillar 133 of FIG. 7) are formed to each door hinge mounting portions for engaging the door hinge 102a and 102b. Positioning apertures (referring to 153 of the forward of the pillar 133 of FIG. 7) are formed to the side panel 101 for being a reference point of the mounting device 100 and the door hinge 102.

The mounting device 100 according to the exemplary embodiment of the present invention may allow for improved matching characteristics between the door hinges 102a and 102b and the side panel 101 despite a slope dispersion in the side panel 101.

In particular, the mounting device for a vehicle door hinge 100 according to the exemplary embodiment of the present invention includes a jig frame 10, a clamping unit 30 and a mounting unit 50. The jig frame 10 is used for supporting constituent elements and includes collars, brackets and supporting blocks and so on for supporting the constituent elements.

The term jig frame 10 is used herein to be inclusive of such constituent elements, otherwise indicated. The jig frame 10 may be a jig frame which is configured to mount door hinges to a side panel of a various kinds of vehicle bodies, and may be a rectangular frame prolonged in the forward and rearward direction of the side panel 101.

The jig frame 10 may includes a plurality of horizontal frames and vertical frames connected to the horizontal frames and a tool changer 11, which may be connected to an arm of a robot (not shown), may be mounted to the jig frame 10.

A first tooling pin 13 is mounted to the jig frame 10 for being a reference point of the jig frame 10 to the side panel 101 and the first tooling pin 13 is fixed to the jig frame 10 via a first fixing bracket 15. When the first tooling pin 13 is inserted into the positioning aperture 153 formed in the side panel 101, the first tooling pin 13 may provide a reference point for the jig frame 10 to the side panel 101. Also, the first tooling pin 13 may provide the direction and distance to a hinge arranging unit 90 which may be described in detail below.

In the exemplary embodiment of the present invention, the clamping unit 30 for fixing the jig frame 10 to the side panel 101 is mounted to upper parts and lower parts (referring to 10a and 10b of FIG. 3) of forward and rearward of the jig frame 10 respectively. Each clamping unit 30 is mounted to the jig frame 10 though a mounting bracket 31 and includes a first clamper 35 which is configured to clamp the side panel 101 by operations of a first cylinder 33. The associated operations and schemes of the clamping unit 30 are known to a person skilled in the art, and thus detailed description will be omitted.

The mounting unit 50 is disposed to a forward side and a rearward side (referring to 10c and 10d of FIG. 2) of the jig frame 10 respectively for installing and arranging the door hinge 102 which would be mounted to the side panel 101. When the side panel 101 is not parallel to the door hinge 102 and dispersed at some angle, the mounting unit 50 is rotatable according to slope dispersion of the side panel 101.

Figure 3:
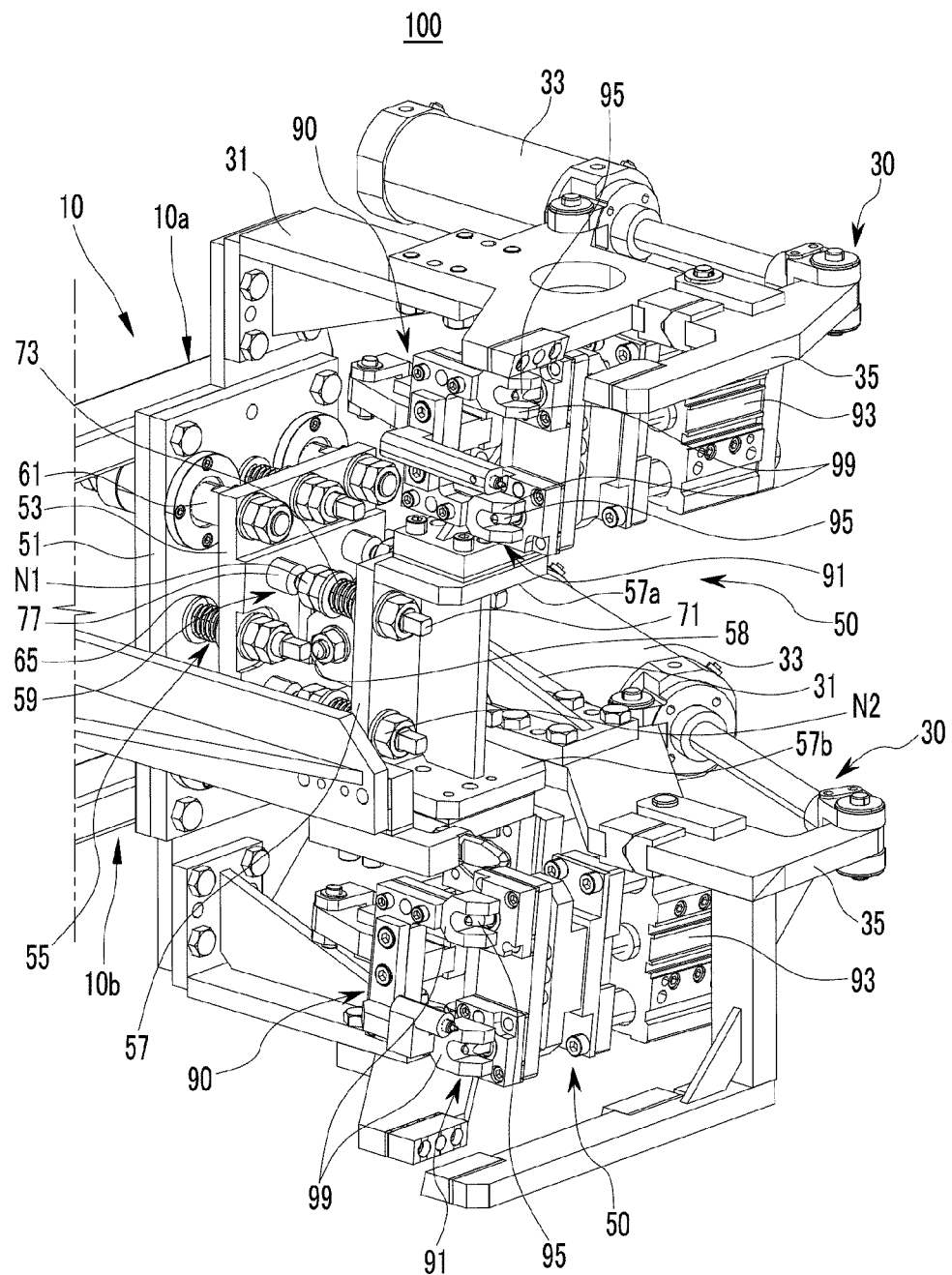
FIG. 3 and FIG. 4 are partial perspective views of a mounting device for a vehicle door hinge according to an exemplary embodiment of the present invention.
Figure 4:
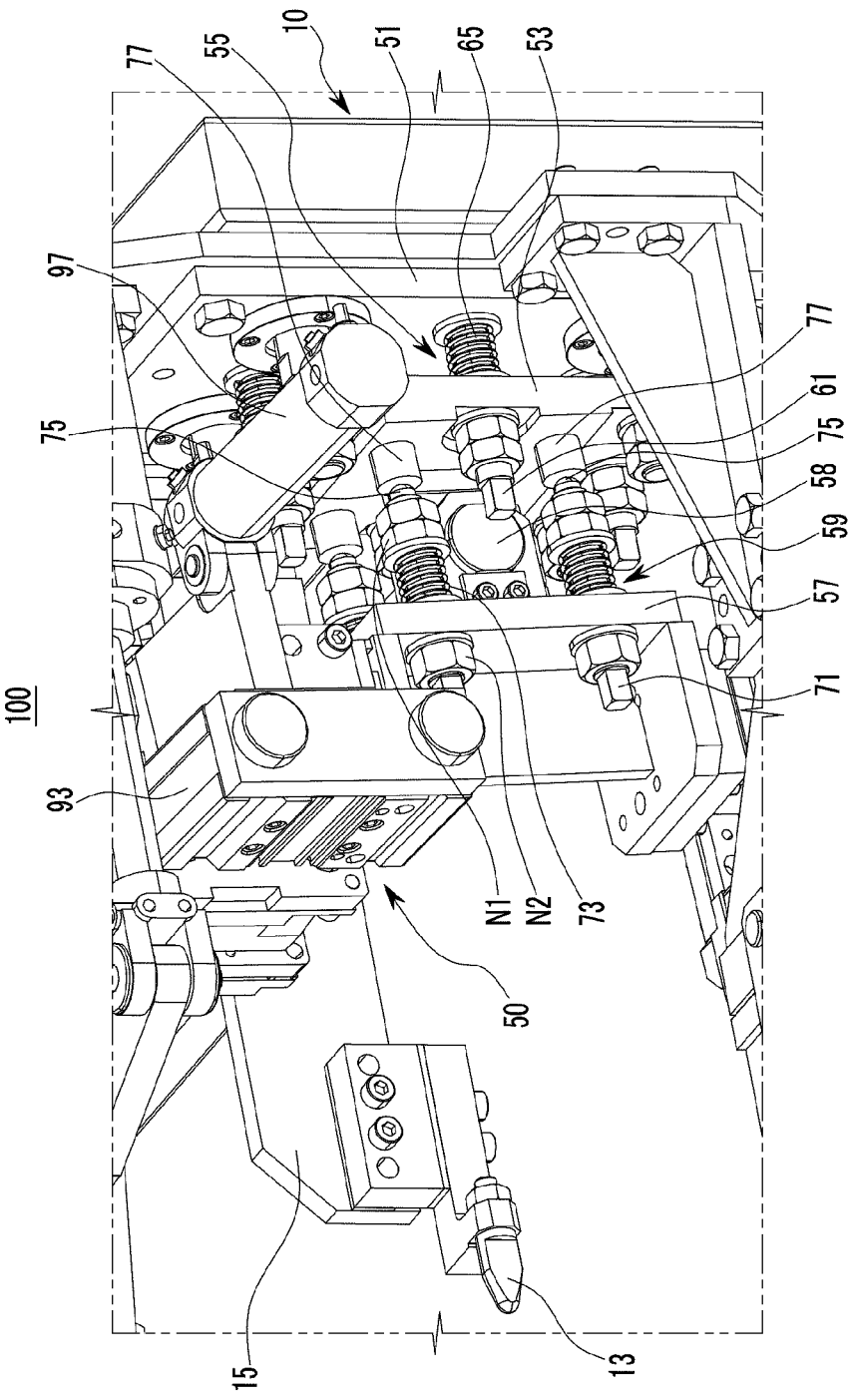
Figure 5:
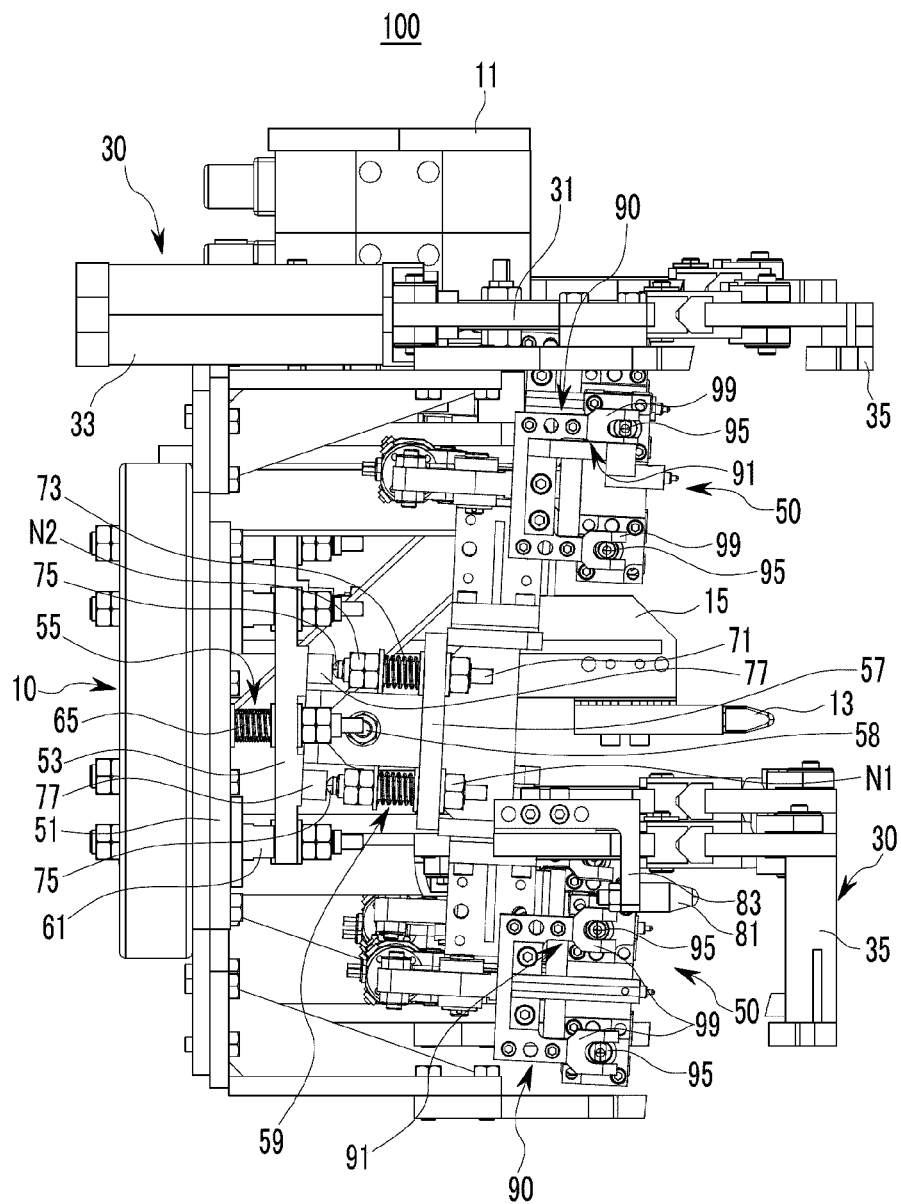
FIG. 5 is a side view of a mounting device for a vehicle door hinge according to an exemplary embodiment of the present invention.

Referring to FIG. 3, FIG. 4 and FIG. 5, the mounting unit 50 includes a base plate 51, a hinge bracket 53, a first guide portion 55, a mounting bracket 57, a second guide portion 59 and a hinge arranging unit 90. The base plate 51 may be mounted to the forward side and a rearward side 10c and 10d of the jig frame 10. The hinge bracket 53 is disposed parallel to the base plate 51 and the hinge bracket 53 may be moved to or from the base plate 51.

The first guide portion 55 guides movement of the hinge bracket 53 to or from the base plate 51 and connects the base plate 51 and the hinge bracket 53, accordingly. The first guide portion 55 includes a plurality of first guide rods 61 connecting the base plate 51 and the hinge bracket 53 and a first spring 65 disposed on the first guide rod 61 between the base plate 51 and the hinge bracket 53.

The mounting bracket 57 may be rotatable around the hinge bracket 53 and hingedly connected to the hinge bracket 53 via a hinge pin 58 and the mounting bracket 57 may be rotatable around the hinge pin 58.

The second guide portion 59 connects the hinge bracket 53 and the mounting bracket 57 and guides the mounting bracket 57 around the hinge bracket 53. The second guide portion 59 includes a plurality of second guide rods 71 and a second spring 73. The second guide rod 71 connects the hinge bracket 53 and the mounting bracket 57 guides the mounting bracket 57 around the hinge bracket 53. The second guide rod 71 is slidably connected to the mounting bracket 57, a pair of the first nut N1 is connected to one end of the second guide rod 71 and a second nut N2 is connected to the other end of the second guide rod 71.

A hemisphere protrusion 75 shaped as hemisphere, contacting the hinge bracket 53, is formed to the end of the second guide rod 71. A stopper 77, contacting the hemisphere protrusion 75, is disposed on the hinge bracket 53 for limiting rotation range of the mounting bracket 57. The second spring 73 is disposed in the second guide rod 71 between the hinge bracket 53 and the mounting bracket 57 and is disposed between the first nut N1 and the mounting bracket 57 in detail.

A second tooling pin 81 is mounted to one mounting bracket 57 of the forward and the rearward mounting bracket 57 to provide a reference point for the door hinge 102 to the side panel 101. The second tooling pin 81 is mounted to the mounting bracket 57 via a second fixing bracket 83.

In the exemplary embodiment of the present invention, the hinge arranging unit 90 arranges and clamps the door hinge 102, which may be mounted to the side panel 101, and mounted to an upper portion and a lower portion (referring to 57a and 57b of FIG. 3) of the mounting bracket 57. The hinge arranging unit 90 includes a pin clamper 91 arranging and clamping the door hinge 102. The pin clamper 91 includes an arranging pin 95, which moves reciprocally by operations of a second cylinder 93 and arranges the door hinge 102, and a second clamper 99 clamping the door hinge 102 by operations of a third cylinder 97. The arranging pin 95 is inserted into an insert aperture (not shown) formed to the door hinge 102 and the second clamper 99 clamps the door hinge 102. The pin clamper 91 is a clamping device known to a person skilled in the art, and thus detailed description will be omitted.

In the exemplary embodiment of the present invention, the door hinges 102 are set to each hinge arranging unit 90 of the mounting unit 50. In this case, the door hinge 102 is arranged by the arranging pin 95 of the pin clamper 91 and clamped by the second clamper 99. And then the jig frame 10 is set to the side panel 101 by inserting the first tooling pin 13 and the second tooling pin 81 into the positioning apertures 153 of the side panel 101 and thus reference positions of the jig frame 10 and the door hinges 102 are set toward the side panel 101. Then the clamping unit 30 fixes the jig frame 10 to the side panel 101 by operations of the first clamper 35.

Each door hinge 102 set to the hinge arranging unit 90 is closely adhered to the upper and lower parts of the forward and rearward pillars 133 and 135 of the side panel 101 and the hinge bracket 53 of the mounting unit 50 compresses the first spring 65 to move toward the side panel 101 guided by the first guide rod 61. Simultaneously, the mounting bracket 57 of the mounting unit 50 is guided by the second guide rod 71 and compresses the second spring 73 to move toward the side panel 101 and also, the door hinge 102 is closely adhered to the pillar of the side panel 101. Then a worker engages each door hinge 102 arranged by the hinge arranging unit 90 and closely adhered to the pillar of the side panel 101 by a bolt.

Figure 6:
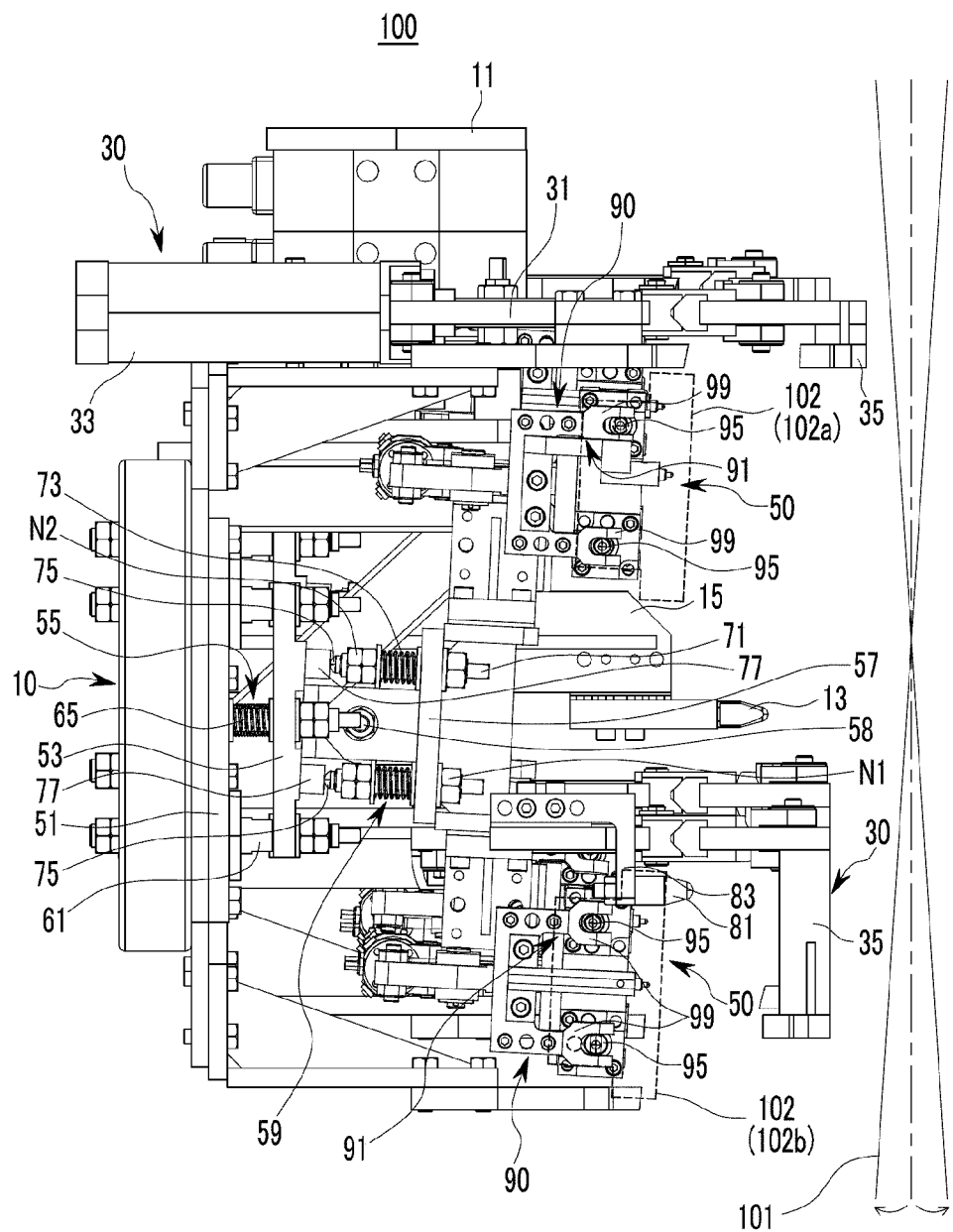
FIG. 6 is a drawing showing operations of a mounting device for a vehicle door hinge according to an exemplary embodiment of the present invention.

During installation of the door hinge 102 to the upper parts and lower parts of forward and rearward of the pillar of the side panel 101 jig frame 10 respectively, as shown in FIG. 6, when the side panel 101 is not parallel to the door hinge 102 with slope dispersion, the mounting bracket 57 rotates around the hinge bracket 53 particularly around the hinge pin 58 according to the slope dispersion. For example, when the side panel 101 is slanted in the clockwise direction in the drawing with some dispersion, the mounting bracket 57 rotates clockwise direction around the hinge bracket 53. In this case, the second guide rod 71 guides the movement of the mounting bracket 57, the second spring 73 is compressed and the hemisphere protrusion 75 contacts the stopper 77. The lower positioned second spring 73 of the drawing is more compressed by the rotation of the mounting bracket 57 and the upper positioned second spring 73 is less compressed or decompressed.

On the contrary, when the side panel 101 is slant anticlockwise direction in the drawing with some dispersion, the mounting bracket 57 rotates anticlockwise direction around the hinge bracket 53. The upper positioned second spring 73 of the drawing is more compressed by the rotation of the mounting bracket 57 and the lower positioned second spring 73 is less compressed or decompressed.

Thus, the mounting bracket 57 maintains predetermined distance and direction toward hinge arranging unit 90 by the first tooling pin 13 and rotates clockwise or anticlockwise direction depending upon the slant of the dispersion.

As described above, according to the exemplary embodiment of the present invention, when the side panel 101 is slanted, the mounting bracket 57 may be rotated to match the door hinge 102 with the side panel 101, and thus matching characteristic may be enhanced. Also, according to the exemplary embodiment of the present invention, a gap between the door hinge 102 and the side panel 101 due to slope dispersion of the side panel 101 may be minimized and thus exterior characteristic of a door may be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mounting device for a vehicle door hinge, comprising:
   a jig frame;
   at least one clamping unit mounted to the jig frame and configured to fix the jig frame to a side panel; and at least one mounting unit connected to the jig frame and configured to install a vehicle door hinge which is mounted to the side panel,
wherein the mounting unit is rotatable based on a slope dispersion of the side panel,
the mounting unit comprises:
a base plate disposed to a forward side and rearward side of the jig frame respectively;
a hinge bracket movably connected to the base plate toward the side panel;
a mounting bracket rotatably connected to the hinge bracket;
a hinge arranging unit connected to an upper portion and a lower portion of the mounting bracket respectively and configured to arrange the door hinge;
a first guide portion configured to connect the base plate and the hinge bracket and guide movement of the hinge bracket against the base plate; and
a second guide portion configured to connect the hinge bracket and mounting bracket and guide rotation of the mounting bracket around the hinge bracket, and the first guide portion comprises:
a plurality of first guide rods configured to connect the base plate and the hinge bracket; and
a first spring disposed within the first guide rod between the base plate and the hinge bracket.

2. The mounting device of claim 1, wherein the second guide portion comprises:
a plurality of second guide rods configured to connect the hinge bracket and the mounting bracket and guide the mounting bracket to rotate around the hinge pin; and
a second spring disposed in the second guide rod between the hinge bracket and the mounting bracket.

3. The mounting device of claim 2, wherein:
the second guide rod is slidably connected to the mounting bracket;
at least one first nut is connected to one end of the second guide rod;
a second nut is connected to the other end the second guide rod; and
the second spring is disposed between the first nut and the mounting bracket,
wherein the one end of the second guide rod contacts the hinge bracket.

4. The mounting device of claim 3, wherein a hemisphere protrusion contacting the hinge bracket is formed to the one end of the second guide rod.

5. The mounting device of claim 4, wherein a stopper, contacting the hemisphere protrusion of the second guide rod, is disposed on the hinge bracket.

6. The mounting device of claim 1, wherein a first tooling pin is mounted to the jig frame to provide a reference point of the jig frame to the side panel.

7. The mounting device of claim 6, wherein the first tooling pin provides a direction and distance to the hinge arranging unit.

8. The mounting device of claim 1, wherein the hinge arranging unit comprises a pin clamper clamping the door hinge.

9. The mounting device of claim 1, wherein a second tooling pin is mounted to the mounting bracket to provide a reference point of the door hinge to the side panel.

10. A mounting device for a vehicle door hinge, comprising:
a jig frame disposed along forward and rearward of a side panel;
clamping units which are disposed to an upper portion and a lower portion of each of the forward side and the rearward side of the jig frame respectively and configured to fix the jig frame to the side panel; and
one or more mounting units disposed on each of the forward side and the rearward side of the jig frame respectively and configured to install the vehicle door hinge which are mounted to the side panel,
wherein the mounting unit is rotatable based on a slope dispersion of the side panel,
the mounting unit comprises:
a base plate disposed to a forward side and rearward side of the jig frame respectively;
a hinge bracket movably connected to the base plate toward the side panel;
a mounting bracket rotatably connected to the hinge bracket;
a hinge arranging unit connected to an upper portion and a lower portion of the mounting bracket respectively and configured to arrange the door hinge;
a first guide portion configured to connect the base plate and the hinge bracket and guide movement of the hinge bracket against the base plate; and
a second guide portion configured to connect the hinge bracket and mounting bracket and guide rotation of the mounting bracket around the hinge bracket, and the first guide portion comprises:
a plurality of first guide rods configured to connect the base plate and the hinge bracket; and
a first spring disposed within the first guide rod between the base plate and the hinge bracket.

11. A method for installing a vehicle door hinge comprising:
providing a jig frame disposed along forward and rearward of a side panel;
fixing the jig frame disposed along forward and rearward of a side panel via clamping units which are disposed to an upper portion and a lower portion of each of the forward side and the rearward side of the jig frame respectively;
rotatably adjusting a mounting unit based on a slope dispersion of the side panel; and
installing the vehicle door hinges on the side panel via the adjusted mounting units disposed on each of the forward side and the rearward side of the jig frame respectively,
wherein the mounting unit comprises:
a base plate disposed to a forward side and rearward side of the jig frame respectively;
a hinge bracket movably connected to the base plate toward the side panel;
a mounting bracket rotatably connected to the hinge bracket;
a hinge arranging unit connected to an upper portion and a lower portion of the mounting bracket respectively and configured to arrange the door hinge;
a first guide portion configured to connect the base plate and the hinge bracket and guide movement of the hinge bracket against the base plate; and
a second guide portion configured to connect the hinge bracket and mounting bracket and guide rotation of the mounting bracket around the hinge bracket, and the first guide portion comprises:
a plurality of first guide rods configured to connect the base plate and the hinge bracket; and
a first spring disposed within the first guide rod between the base plate and the hinge bracket.

* * * * *